(12) United States Patent
Guillot

(10) Patent No.: US 12,062,179 B2
(45) Date of Patent: Aug. 13, 2024

(54) METHOD FOR AUTOMATICALLY SEGMENTING TEETH

(71) Applicant: BOREA, Limoges (FR)

(72) Inventor: Julien Guillot, Limoges (FR)

(73) Assignee: BOREA, Limoges (FR)

( * ) Notice: Subject to any disclaimer, the term of this patent is extended or adjusted under 35 U.S.C. 154(b) by 372 days.

(21) Appl. No.: 17/427,653

(22) PCT Filed: Feb. 4, 2020

(86) PCT No.: PCT/EP2020/052723
§ 371 (c)(1),
(2) Date: Aug. 1, 2021

(87) PCT Pub. No.: WO2020/161121
PCT Pub. Date: Aug. 13, 2020

(65) Prior Publication Data
US 2022/0148185 A1    May 12, 2022

(30) Foreign Application Priority Data

Feb. 4, 2019   (FR) ..................... 19/01075

(51) Int. Cl.
*G06T 7/11* (2017.01)
*A61C 9/00* (2006.01)
*G06T 7/12* (2017.01)

(52) U.S. Cl.
CPC .............. *G06T 7/11* (2017.01); *A61C 9/0046* (2013.01); *G06T 7/12* (2017.01); *G06T 2200/04* (2013.01); *G06T 2207/30036* (2013.01)

(58) Field of Classification Search
CPC ......... G06T 7/11; G06T 7/12; G06T 2200/04; G06T 2207/30036; A61C 9/0046
See application file for complete search history.

(56) References Cited

U.S. PATENT DOCUMENTS

| 2005/0019732 | A1 | 1/2005 | Kaufmann et al. |
| 2011/0104630 | A1* | 5/2011 | Matov ............... A61C 9/004 703/1 |
| 2017/0076443 | A1* | 3/2017 | Ye ..................... A61B 5/742 |

OTHER PUBLICATIONS

Chuon et al., "Surface Mesh Segmentation Using Local Geometry", Sixth International Conference on Computer Graphics, Imaging and Visualization, Aug. 11, 2009, pp. 250-254, ISBN: 978-0-7695-3789-4, DOI: 10.1109/CGIV.2009.15.

(Continued)

*Primary Examiner* — Casey L Kretzer
(74) *Attorney, Agent, or Firm* — FisherBroyles, LLP; James W. Hill; Andrew Gonsalves

(57) ABSTRACT

Method for segmenting a digital model (4) of teeth comprising a three-dimensional triangular mesh (41), wherein automatic means (6) implement the following steps, which are referred to as initial steps:
classifying, within the mesh (41), at least one triangle into a concave category and/or at least one triangle into a convex category, and
identifying, within the mesh (41), at least one tooth region comprising triangles such that each triangle of the region has at least one neighbouring triangle in the region, all the triangles of the region belonging to neither the convex nor the concave category.

19 Claims, 13 Drawing Sheets

(56) References Cited

OTHER PUBLICATIONS

Kim et al., "Automatic tooth segmentation of dental mesh using a transverse plane", 2018 40th Annual International Conference of the IEEE Engineering in Medicine and Biology Society (EMBC), IEEE, Jul. 18, 2018, pp. 4122-4125, DOI: 10.1109/EMBC.2018.8513318.
International Application No. PCT/EP2020/052723 International Search Report and Written Opinion mailed Feb. 27, 2020, English Translation.

\* cited by examiner

[Fig. 1]
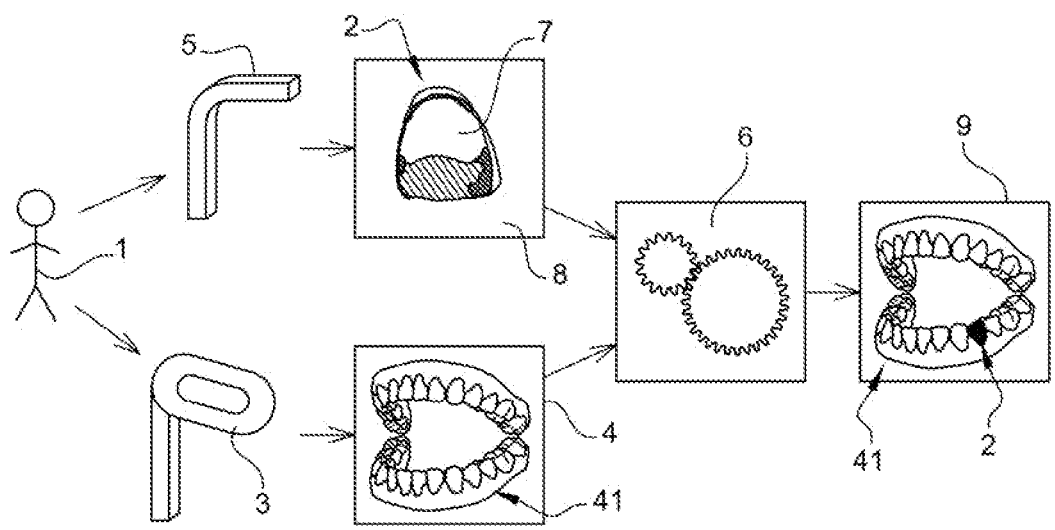
[Fig. 2]
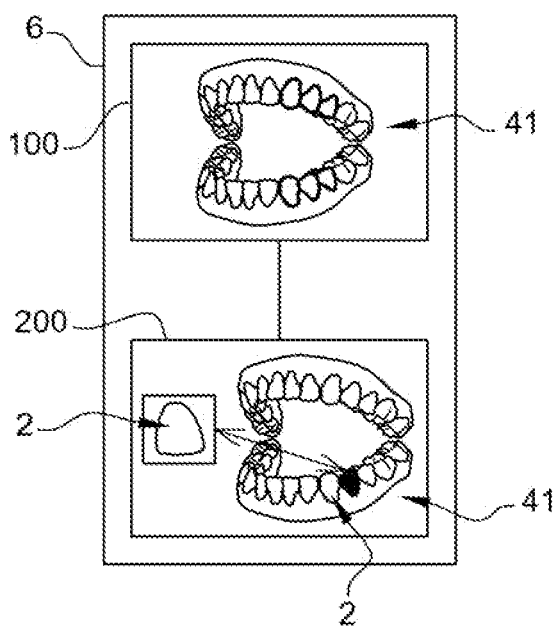

[Fig. 3]
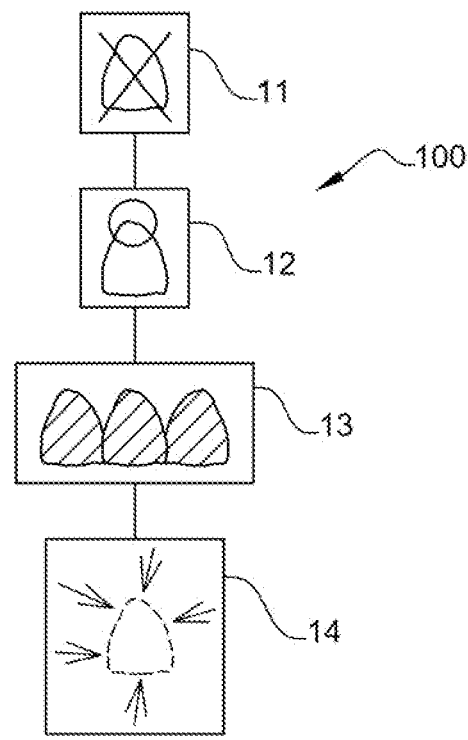
[Fig. 4]
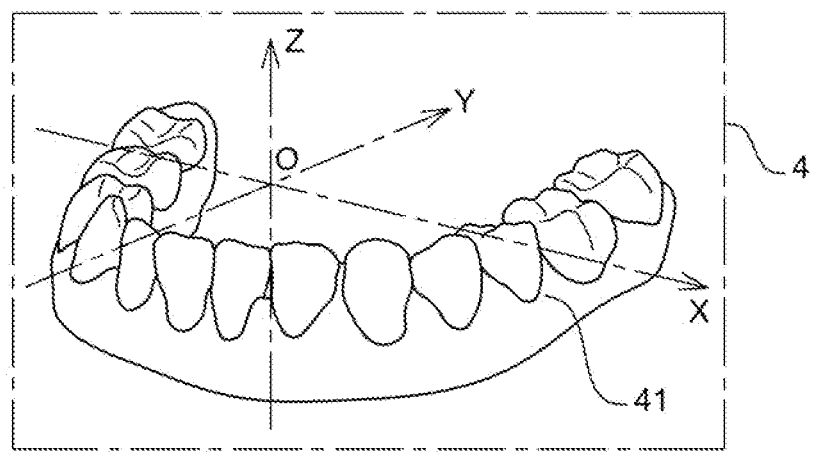

[Fig. 5]
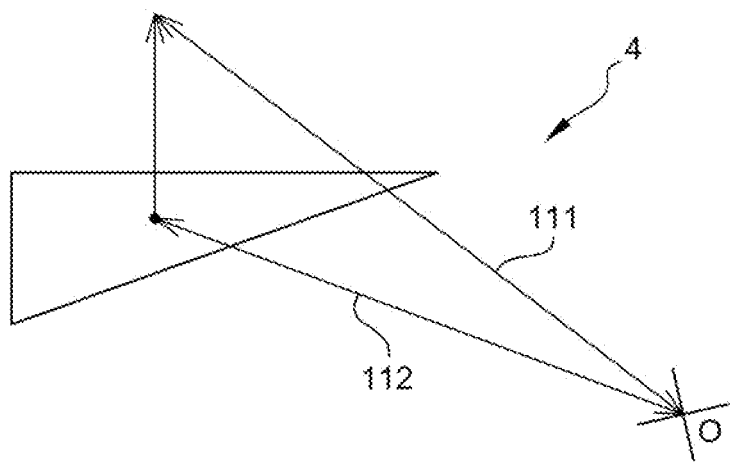
[Fig. 6]
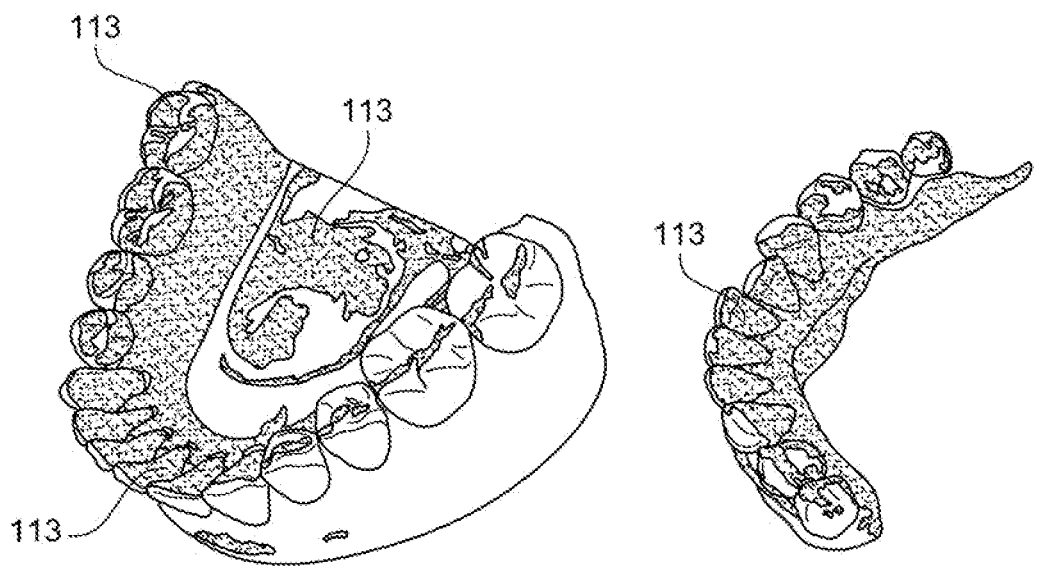

[Fig. 7]
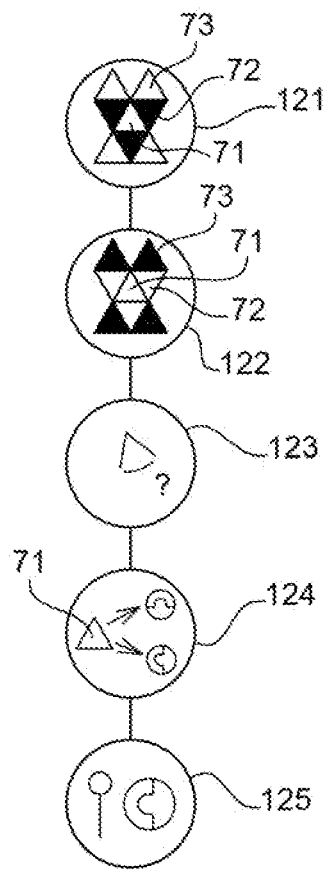
[Fig. 8]
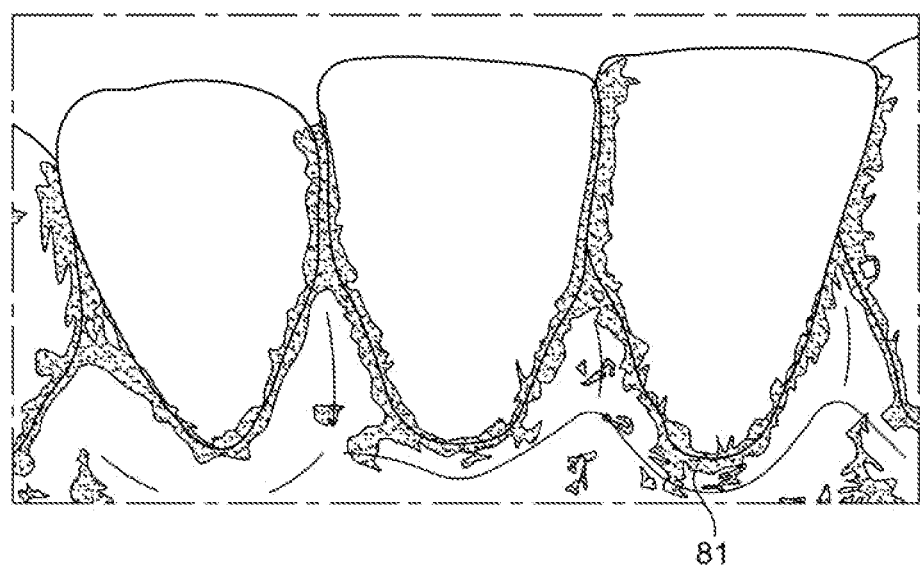

[Fig. 9]
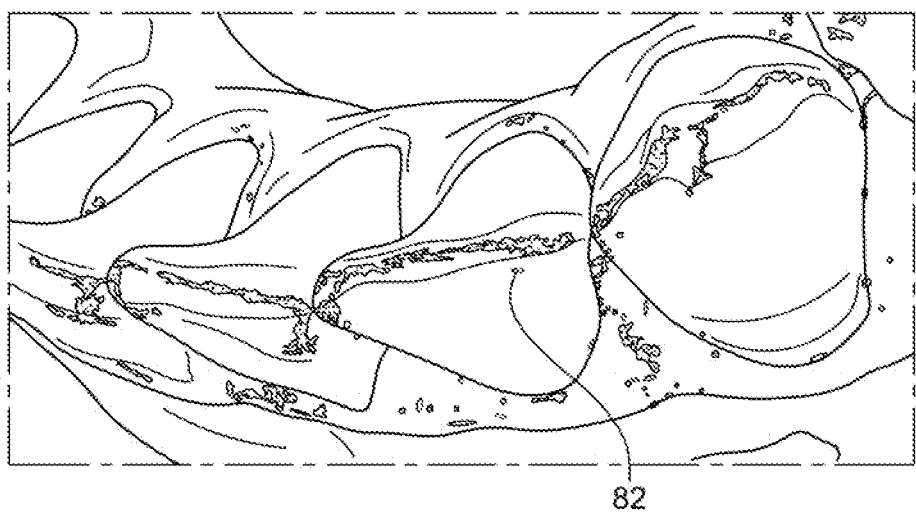
[Fig. 10]

[Fig. 11]
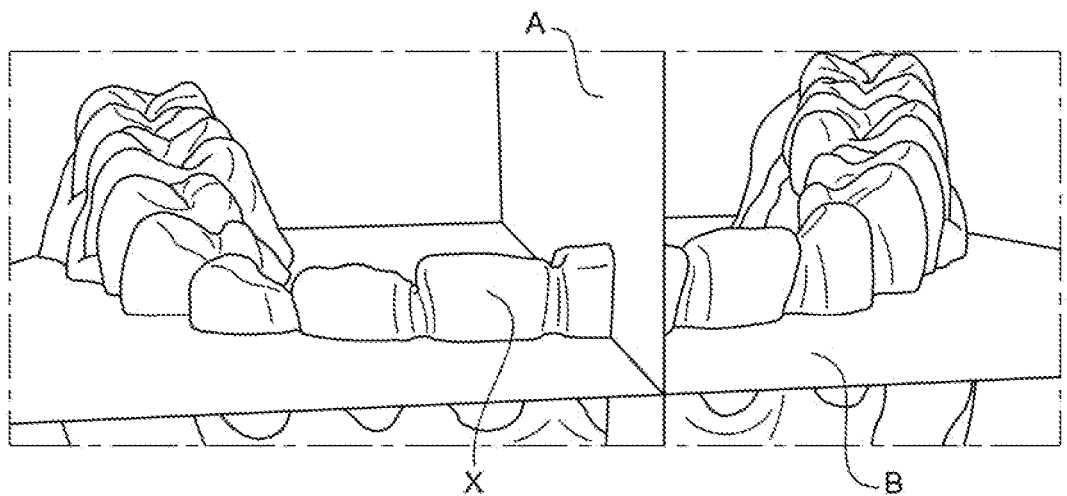
[Fig. 12]
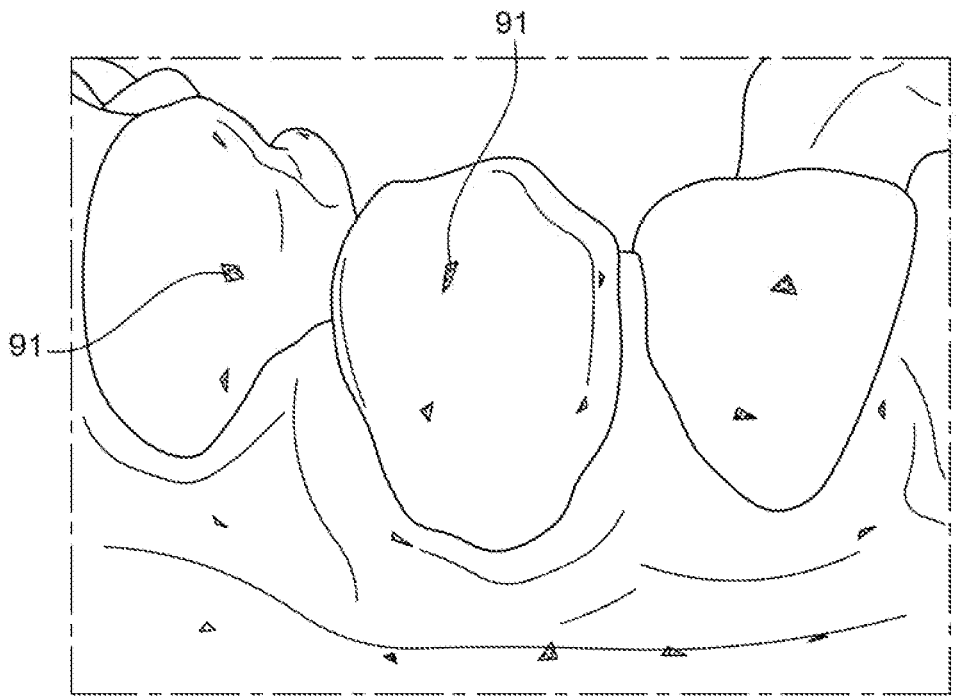

[Fig. 13]
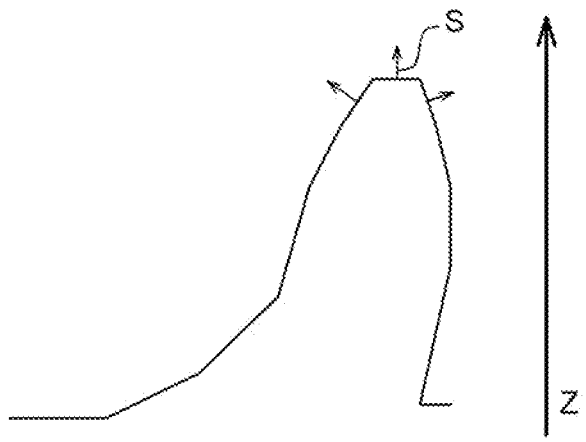
[Fig. 14]
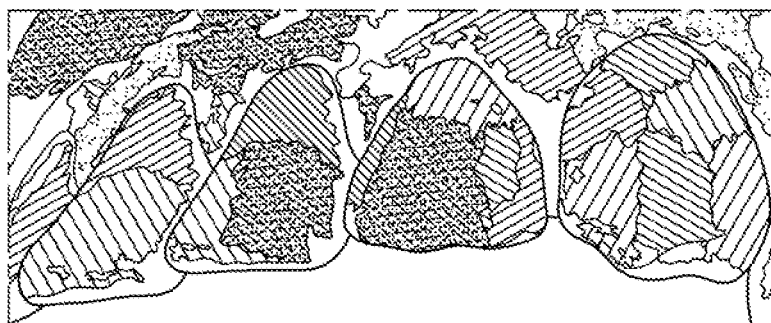
[Fig. 15]
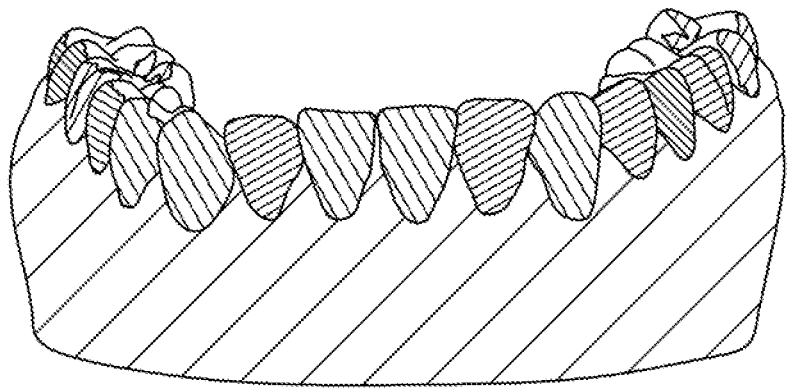

[Fig. 16]
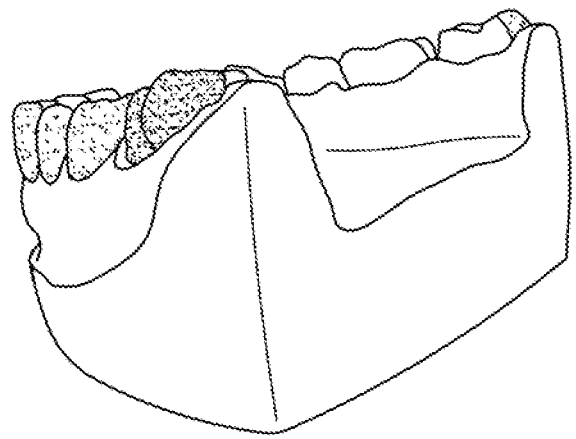

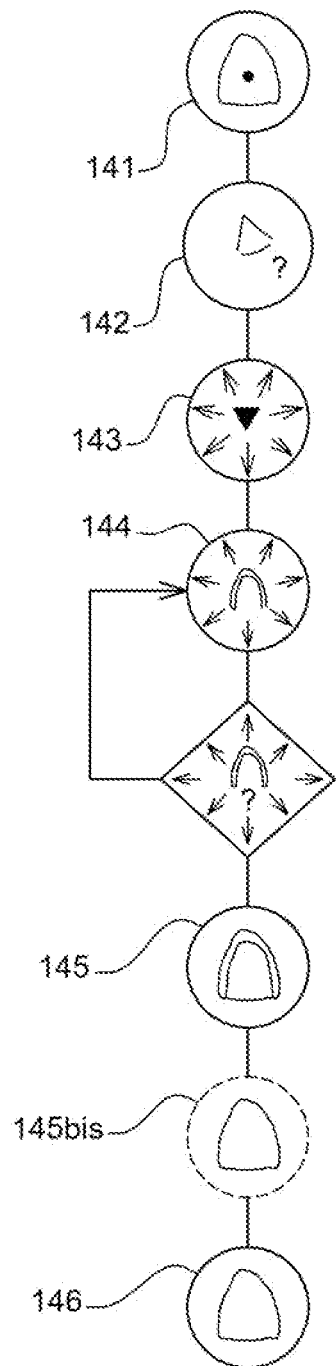
[Fig. 17]

[Fig. 18]
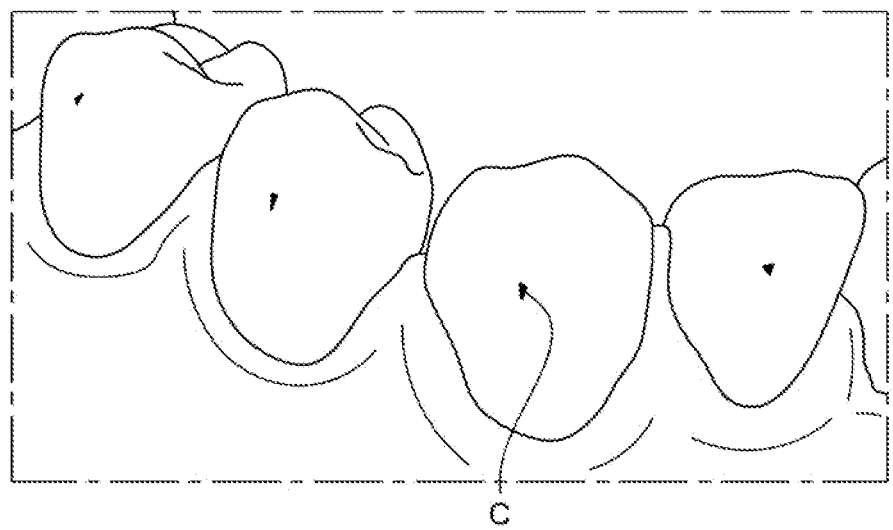
C
[Fig. 19]
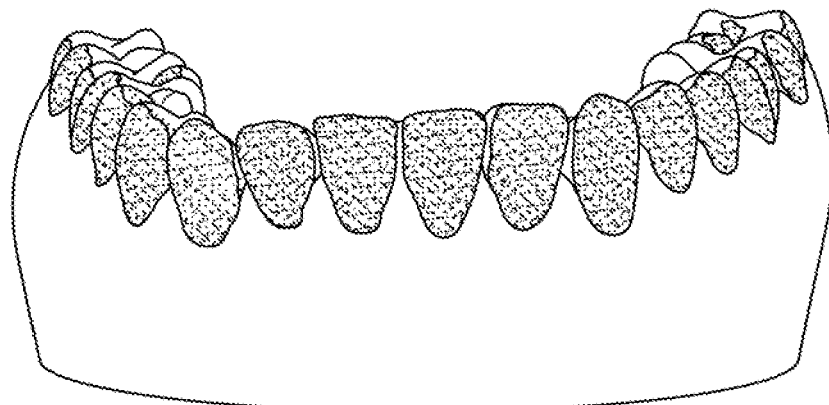
[Fig. 20]
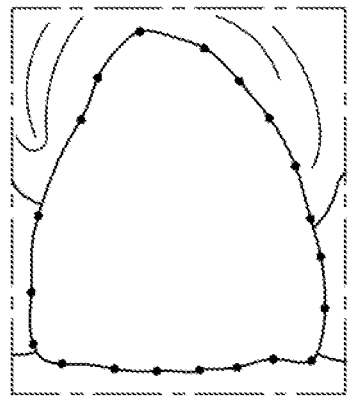

[Fig. 21]
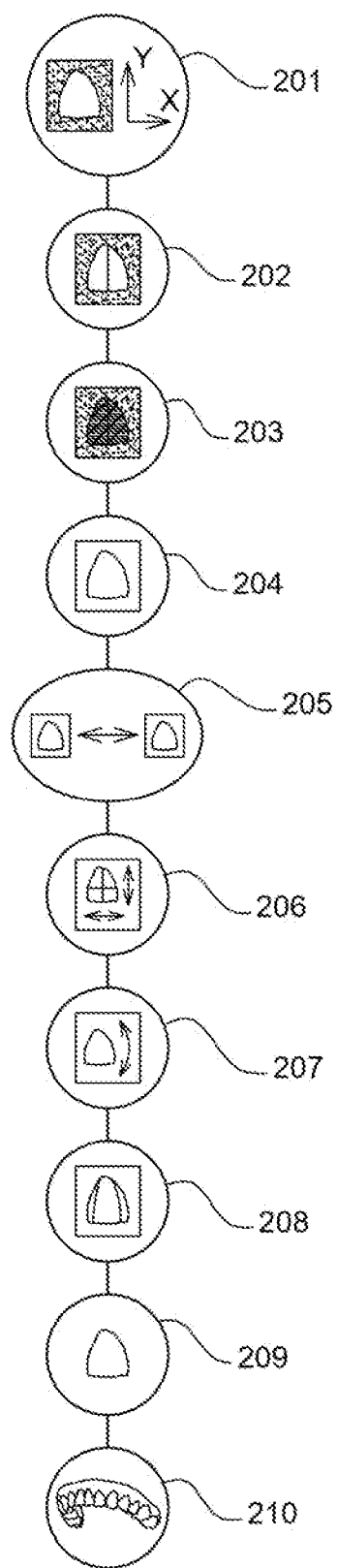

[Fig. 22]
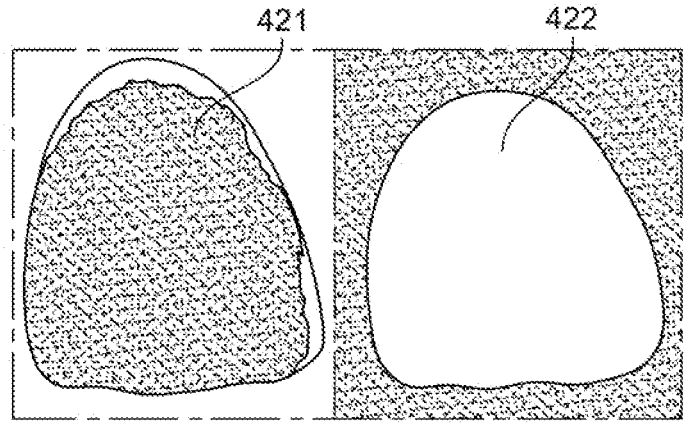
[Fig. 23]
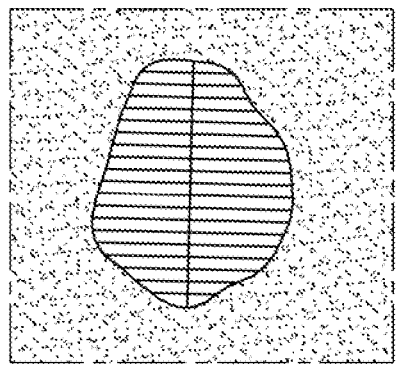
[Fig. 24]
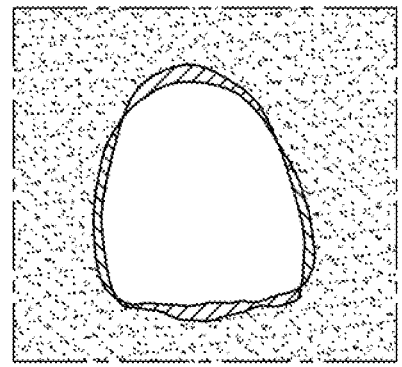

[Fig. 25]
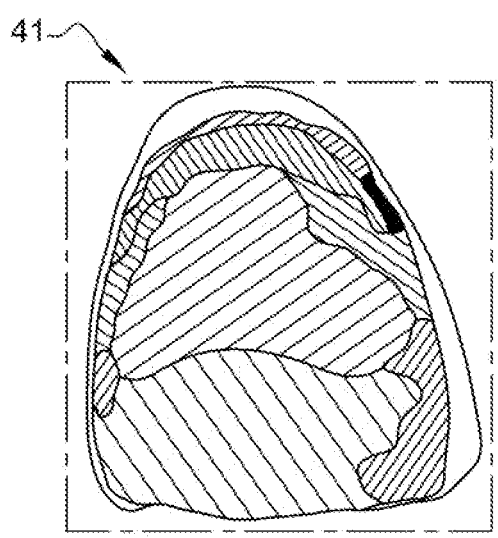

METHOD FOR AUTOMATICALLY SEGMENTING TEETH

The invention relates to medical imaging in the field of dental prostheses. In particular, it relates to the segmentation of a digital model of teeth comprising a three-dimensional triangular mesh.

An optical scanner is used to measure the dimensions of a patient's dental arch inside the mouth. This device, associated with three-dimensional viewing software, is used to obtain and display a very precise triangular mesh of the dental arch. This technology is useful for the dental prosthetist to create the shape of a tooth prosthesis, and is used to transmit and store information concerning the dimensions of the patient's dental arch.

However, this type of scanner cannot be used to precisely measure the information relating to the shades and translucency of the patient's teeth. Consequently, most dentists continue to use traditional shade tabs held in the hand to compare them manually with the patient's teeth, in order to select the shades of the prosthesis to be manufactured which appear to best match, under the naked eye, the shades of the patient's teeth. However, this type of comparison is highly approximate and the prosthesis manufactured does not match the colours of the patient's teeth closely enough. This means that the prosthesis is not aesthetic in the mouth.

To obtain precise shade and translucency information, other technologies exist, such as spectrophotometers (such as the "Rayplicker" in the name of the applicant) which can be used to precisely identify, for a given tooth, the colour and translucency hues of the tooth and locate them on said tooth in a file representing the tooth in two dimensions.

However, the three-dimensional dental arch measurement technologies and the two-dimensional tooth shade determination technologies are not compatible. In other words, a spectrophotometry system cannot be integrated in a dental arch digital measurement system due to the nature of these two techniques. The permanent movement of the optical scanner used to digitise the patient's entire dental arch in three dimensions is not compatible with the need for stability, over a period of about one second, necessary to perform the spectrophotometric analysis of a single tooth.

To solve this problem, a tooth associated with localised shade and translucency values, obtained using a spectrophotometer, would have to be digitally associated with the corresponding tooth represented in a triangular mesh obtained using an optical scanner. However, we are talking about two different digital representations: one being a two-dimensional representation of a tooth, the other a three-dimensional representation of unidentified teeth.

Firstly, therefore, it must be possible to identify what is a tooth within the three-dimensional triangular mesh. Secondly, the reference tooth of known shades and translucency values must be compared with each of the teeth identified in the mesh, in order to find the corresponding tooth.

The state of the art, in particular in document "*A Fast Segmentation Method for STL Teeth Model*" (Zhanli Li), already describes a method for segmenting a digital model of teeth comprising a three-dimensional triangular mesh, taking as input a seed triangle and using a conventional "Region Growing" algorithm to identify a tooth region comprising this seed triangle.

However, the tooth region identified using this algorithm is not sufficiently precise and may extend over several teeth which are nevertheless separate. It is therefore difficult to find within the mesh the tooth corresponding to the reference tooth.

In addition, seed triangles located on respective teeth must be supplied so that the method described starts the segmentation. This method is therefore unable to perform automatic tooth segmentation starting only from the triangular mesh, without any other information.

The invention aims in particular to improve the segmentation of a tooth digital model comprising a three-dimensional triangular mesh.

An object of the invention is also to allow the model to be segmented automatically from the mesh.

Another object of the invention is to simplify the identification of a tooth, within a triangular mesh, corresponding to a reference tooth of a two-dimensional representation.

The invention thus relates to a method for segmenting a digital model of teeth comprising a three-dimensional triangular mesh, characterised in that automatic means implement the following steps, which are referred to as initial steps:

classifying, within the mesh, at least one triangle into a concave category and/or at least one triangle into a convex category, and identifying, within the mesh, at least one tooth region comprising triangles such that each triangle of the region has at least one neighbouring triangle in the region, all the triangles of the region belonging to neither the convex nor the concave category.

The tooth is in fact separated from its neighbouring teeth and the gum by highly concave regions. In addition, the apex of the tooth, acting as intermediate between the surface of the tooth exposed at the outside of the model and the inside of the dental arch, corresponds to highly convex regions. By classifying the triangles of the mesh into a convex category or into a concave category, the boundaries of the tooth are identified. The triangles not classified in either the concave or convex category are uncategorised, in other words they are intended to be part of the tooth region to be identified.

Thus, by identifying the tooth region, it is possible to identify the triangles forming the tooth, delimited by its boundaries consisting of concave or convex regions that are not part of it. A tooth region extending over a single tooth is therefore identified. As a corollary, the tooth regions extending over each digitised tooth of the dental arch can therefore be identified within the mesh.

In addition, using this method, it is subsequently easier to compare the tooth or teeth within the mesh with a two-dimensional reference tooth. The or each tooth of the mesh is identified starting from a tooth region which only corresponds to a single tooth and at least largely to the outer surface of said tooth. It is therefore easier to identify the contours and compare them with those of the reference tooth.

Advantageously, to perform the step of classifying the triangle into the concave or convex category, the automatic means implement the following sub-steps:

for at least one of the triangles of the mesh, determining angle values between the triangle and each neighbouring triangle of each triangle neighbour to the triangle, and depending on the angle values determined, classifying the triangle into a concave category or a convex category.

Thus, the means classify the triangle considered depending on its "second neighbours", the "second neighbours" being the neighbours of the triangle's neighbours. A region larger than that of the immediate neighbours can therefore be taken into account.

Preferably, the automatic means determine the angle values using the normal of the triangle and the normals of each neighbouring triangle of each triangle neighbour to the triangle.

Thus, since these normals are already known from the digital model, the angles are quickly determined.

Advantageously, for at least one triangle in the concave category, the automatic means implement the following steps:
- determining the number of triangles neighbours to the triangle which are in the concave category, and
- if the number is less than a predetermined value, removing the triangle from the concave category.

Thus, this additional pass reduces the noise which is generally present in the concave regions, in other words removes the triangles which have been classified into a concave category although they are quite isolated and do not belong to a concave region of the mesh.

Preferably, to perform the step of identifying the tooth region, the automatic means implement the following substeps:
- determining, within the mesh, a seed triangle belonging to neither the concave category nor the convex category,
- selecting triangles neighbours to the seed triangle, belonging to neither the concave category nor the convex category and whose respective normals have values that lie within a predetermined interval, and
- considering each of the triangles selected as a seed triangle, repeating the preceding step for each seed triangle, until there are no more uncategorised triangles to be selected, so as to identify the tooth region comprising the selected triangles.

Thus, a "region growing" algorithm is performed in order to determine a region comprising triangles located on a single tooth and neighbours to each other. The triangles belonging to different teeth are therefore identified. Having extracted the "concave" or "convex" triangles, it is possible to build regions which will stop at the intersections between the teeth (concave regions) or at the intersections with other elements (convex regions for the apices, concave regions for the gums) and therefore to avoid having a region extending over several separate teeth.

Advantageously, the automatic means determine, within the mesh, several separate seed triangles not belonging to either the concave or convex category, so as to identify several separate tooth regions.

Thus, several tooth regions are built within the mesh.

Preferably, the automatic means implement the following steps:
- for the tooth region or at least one of the tooth regions, determining a number of neighbouring triangles located in a tooth region neighbour to the tooth region,
- if the number of neighbouring triangles is greater than a predetermined value, merging the tooth region with the neighbouring tooth region so that the two regions form a single tooth region.

Thus, while at the end of the preceding step, several regions could correspond to one tooth, the neighbouring tooth regions are now merged so that a single tooth region corresponds to a single tooth.

Advantageously, the automatic means implement the following steps:
- for the tooth region or at least one of the tooth regions, determining the number of triangles of the region and an average curvature value of the region,
- if the number of triangles is greater than a predetermined maximum value, less than a predetermined minimum value, and/or if the average curvature value is less than a predetermined threshold, marking the tooth region so as to no longer identify the triangles of the tooth region as being part of a tooth region.

Thus, while at the end of the preceding step, tooth regions corresponding to other elements of the mesh could remain, these possible regions are now removed so that each remaining region corresponds to a tooth. The elements removed are either too flat, such as any digitised dental pedestals, or too large such as the gums, or too small to correspond to teeth. This avoids keeping elements which, once projected in two dimensions, would have the shape of a tooth although they do not correspond, in three dimensions, to a tooth. This is necessary in order to search subsequently for a tooth, of known surface in two dimensions, within the three-dimensional mesh.

Preferably, prior to the initial steps, the automatic means implement the following steps:
- for at least one of the triangles of the mesh, determining the orientation of the normal of the triangle, and
- if the normal is oriented towards the inside of the mesh, marking the triangle so as not to identify it as being part of a tooth region.

This step is performed to mark the triangles of the mesh which would correspond to the internal regions of the dental arch, such as the inner surface of the teeth. It can be performed before all the other steps. We are in fact only interested in the outer surface of the teeth, since it is on the outer surface of one of these teeth that shade and/or translucency values are measured, and it is these outer tooth surfaces which must be compared with the reference tooth where these values are known to find the corresponding tooth within the mesh.

Advantageously, after the initial steps, the automatic means implement the following steps:
- for the tooth region or at least one of the tooth regions, determining a base triangle of the tooth region,
- from the base triangle, determining contours of a tooth comprising the base triangle.

Thus, for a tooth region, we start from a triangle of the region and perform a "region growing" algorithm to obtain the precise contours of the tooth. The contours of the tooth regions may in fact not be sufficiently precise if they are to be compared with the precise contours of a reference tooth represented in two dimensions.

Preferably, since the base triangle is a central triangle located at the centre of the tooth region, the automatic means implement the following steps for its determination:
- determining the coordinates, within the mesh, of the centre of the tooth region, using the coordinates of the centre of each triangle of the tooth region, and
- determining the central triangle of the tooth region by comparing the coordinates of each triangle of the tooth region with the coordinates of the centre of the region that have been determined and by identifying as central triangle the triangle closest to the centre of the tooth region.

Thus, the central triangle of each region is identified as being the base triangle of each region. The base triangle is that which is the most suitable to subsequently obtain the tooth contours since, having built the tooth region, we know that it is at the centre of the tooth and that therefore the "region growing" algorithm will be optimum.

Advantageously, to determine the tooth contours, the automatic means implement the following steps:

for each tooth region, identifying each base triangle of the tooth region as being part of a tooth surface corresponding to the tooth region,
for each tooth region, determining angle values between each triangle of the region and the neighbours of the triangle,
determining an average angle value for each triangle of the region according to the angle values determined,
if the average angle value is less than a predetermined value, identifying the triangle as being part of the tooth surface corresponding to the tooth region,
for each triangle neighbour to the base triangle, if the neighbouring triangle belongs to the tooth region of the base triangle, identifying the neighbouring triangle as being part of the tooth surface corresponding to the tooth region,
considering each neighbouring triangle selected as a base triangle, repeating the preceding step for each base triangle, until there are no more triangles of the region to be identified as being part of the surface,
for each tooth surface, expanding the surface by adding to the surface triangles which are neighbours of the triangles of the surface and which belong to the same tooth region as the triangles of the surface,
for each tooth surface, eroding the surface by removing from the surface triangles which have a neighbour belonging to the same tooth region but not identified as being part of the surface,
determining the contours of the tooth surface by calculating one or more Bézier curves.

It is the "region growing" algorithm used to obtain the precise contours of the tooth. The previously identified tooth regions are used, while refining the method used to obtain the triangles located at the boundaries of the tooth, by means of the various steps mentioned, so as to obtain the precise contours of the tooth.

Advantageously,
if the number of triangles of the surface is less than the number of triangles of the tooth region, or
if the number of triangles added after the expansion is less than a predetermined number, new expansion of the surface.

The number of expansions thus depends on the efficiency of each new expansion pass and on the size of the tooth surface formed after each pass. This number is therefore optimised to determine the outermost contours while respecting the shapes of the tooth.

Preferably, to determine a correspondence between a reference tooth of a two-dimensional representation and a tooth of the tooth digital model comprising the three-dimensional triangular mesh, the automatic means implement the following steps:
segmenting the triangular mesh according to one of the preceding methods so as to identify contours of at least one tooth of the mesh,
obtaining a two-dimensional representation of a surface of the reference tooth,
obtaining a two-dimensional representation of a surface, delimited by the contours, of the tooth of the mesh,
determining a first ratio between a height and a width of the surface of the reference tooth and a second ratio between a height and a width of the surface of the tooth of the mesh,
if the difference between the first ratio and the second ratio is greater than a predetermined value, identifying the tooth of the mesh as not corresponding to the reference tooth, otherwise:
transforming, according to the Levenberg-Marquardt algorithm, the two-dimensional representation of the reference tooth, so as to compare by overlap the surface of the reference tooth and that of the tooth of the mesh,
determining an overlap value between the surface of the reference tooth and that of the tooth of the mesh,
if the overlap value lies within a predetermined interval, identifying the tooth of the mesh as corresponding to the reference tooth.

Thus, after obtaining the surface of the tooth of the mesh, for each tooth of the mesh, the surface of the tooth of the mesh, in two dimensions, is compared with the surface of the reference tooth to determine whether or not they correspond.

Advantageously, instead of identifying the corresponding tooth directly using the overlap value, the automatic means implement the following steps:
cutting the surface of the reference tooth so as to identify several parts of the surface,
cutting the surface of the tooth of the mesh in a corresponding manner,
determining values in relation with each part of the surfaces determined,
determining a comparison value between the values determined for each part of the surface of the reference tooth and the respective values for each corresponding part of the surface of the tooth of the mesh,
determining an identification value between the surface of the reference tooth and the surface of the tooth of the mesh depending on the comparison value and the overlap value,
if the identification value lies within a predetermined interval, identifying the tooth of the mesh as corresponding to the reference tooth.

Thus, the shape features of each tooth are taken into account using the values obtained in relation with the parts of each tooth, so that the identification of the corresponding tooth is more precise.

Preferably, after determining overlap values or identification values for several teeth of the mesh compared with the reference tooth, the automatic means identify as corresponding to the reference tooth the tooth of the mesh whose overlap value or identification value is the most appropriate.

Thus, a comparison is made between the reference tooth and each tooth of the mesh, and the tooth of the mesh best corresponding to the reference tooth is chosen as corresponding.

Alternatively, it would be possible not to choose any tooth of the mesh as corresponding if none of the teeth has one or more values lying within the intervals mentioned.

Advantageously, once the corresponding tooth of the mesh has been identified, the automatic means identify at some parts of the corresponding tooth of the mesh, within the mesh, one or more shade values associated with parts of the reference tooth, the parts of the reference tooth and the parts of the corresponding tooth of the mesh corresponding to each other.

Thus, the corresponding tooth and its shade and/or translucency values can be seen directly within the mesh, in three dimensions.

The invention also provides for a computer program comprising code instructions that can control execution of the steps of a method as described previously.

The invention also provides for a method of obtaining such a program in order to download it on a communication network.

Lastly, the invention also provides for a computer-readable medium, on which the preceding computer program is stored.

BRIEF DESCRIPTION OF THE FIGURES

The invention will be better understood on reading the following description, given solely by way of example and with reference to the accompanying drawings in which:

FIG. 1 a diagram illustrating the general method according to an embodiment of the invention, FIG. 2 is a diagram illustrating the two main phases according to the embodiment of the invention of FIG. 1, FIG. 3 is a diagram illustrating a first phase of the embodiment, FIG. 4 is a representation of a digital model used in the embodiment of the invention, FIG. 5 is an illustration of a step according to the embodiment of the invention, FIG. 6 is an image resulting from this step, FIG. 7 is a diagram illustrating sub-steps according to the embodiment, FIG. 8 is an image resulting from one of the sub-steps, FIG. 9 is an image resulting from the same sub-step, FIG. 10 is a diagram illustrating other sub-steps according to the embodiment, FIG. 11 is an image resulting from one of the sub-steps, FIG. 12 is an image resulting from another one of the sub-steps, FIG. 13 is an illustration of another one of the sub-steps, FIG. 14 is an image resulting from the preceding sub-steps, FIG. 15 is an image resulting from the next sub-step, FIG. 16 is an image resulting from the next sub-step, FIG. 17 is a diagram illustrating other sub-steps according to the embodiment, FIG. 18 is an image resulting from one of the sub-steps, FIG. 19 is an image resulting from a next sub-step, FIG. 20 is an image resulting from a next sub-step and illustrating the end of the first phase according to the embodiment, FIG. 21 is an illustration of a second phase according to the embodiment of the invention, FIG. 22 is an image resulting from a step of this second phase, FIG. 23 is an image resulting from a next step, FIG. 24 is an image resulting from a next step, and FIG. 25 is an image resulting from the end of the second phase.

DETAILED DESCRIPTION

I. Summary of the Method According to the Invention

As illustrated on FIG. 1, firstly the dental arch of a patient 1 is digitised using an optical scanner 3 and, secondly, one of the teeth of the same patient 1 is subjected to a spectrophotometric analysis using a spectrophotometer 5, for example the "Rayplicker" device put on the market by the applicant, which deduces from the measurements of its spectrophotometer 5 the shade and translucency values of the tooth. In the remainder of the document, we will speak indifferently of the spectrophotometer 5 or of the device, such as the Rayplicker, which processes the measurements obtained using the spectrophotometer 5.

The optical scanner 3 is used to obtain a digital model 4 of teeth comprising a three-dimensional triangular mesh 41, in other words a three-dimensional digital representation of the dental arch of the patient 1, digitised by the optical scanner 3. In this case, this representation is encoded in an "stl" type file, but it could correspond to any type of 3D file, such as "obj" or "ply". In this model, the surface 41 forming the dental arch is represented by triangles, which each have a normal oriented in a direction facing the triangle. Each normal is a normalised vector, whose length is therefore 1. The normal is used to specify the orientation of the triangle, and to make a boundary between what is inside a volume such as the dental arch 41, and what is outside, the normal being oriented from the triangle towards the outside of the dental arch. The coordinates of each vertex of the triangles can be determined, as well as those of any point of a triangle. Thus, the dimensions of the dental arch 41 are known. However, these triangles represent sometimes tooth parts, sometimes gum parts, or other elements of the dental arch, and they are not identified as being part of any particular region of the dental arch 41. Similarly, shade and translucency values of the dental arch are not associated with these triangles.

The spectrophotometer 5 can be used to obtain a two-dimensional representation 8 of a single tooth 2, with which shade and translucency values of the tooth are associated. These values are associated with the parts of the tooth to which they correspond. For example, the part 7 of the tooth 2 has a shade value and a translucency value determined using the spectrophotometer 5. These values may be different from those associated with another part of the tooth 2.

The invention aims in particular to find the tooth 2, obtained using the spectrophotometer 5, in the mesh 41 where the entire dental arch of the patient 1 was digitised.

Thus, automatic means, such as one or more data processing devices 6, for example one or more computers, perform the method aimed at achieving the above-mentioned purpose. In the remainder of the document, "means" or "automatic means" will designate any type of automatic means such as those mentioned above, which are used to perform steps of a method automatically and digitally, using computing power supplied by any processor, possibly also by means of telecommunications networks. These means include or use database services to store or obtain any type of data required to perform the steps described, such as calculated values, coordinates or two- or three-dimensional images. The steps described in the remainder of the document can therefore be written as one or more computer programs, which can be executed automatically as required by the user of the invention.

The user of the invention designates in particular a dentist or other specialist in the dental field such as a dental prosthetist. To interact with the invention, the user may have an interface where s/he triggers the execution of all the steps described or only some of the steps as required. S/he may also display on this interface the results of the invention and interact with the files or images displayed.

As illustrated on FIG. 2, a first phase 100 aims to segment the mesh 41 so as to identify and distinguish the teeth within the mesh. The aim is therefore to identify all the triangles belonging to a given tooth, potentially for each tooth of the mesh. In a second phase 200, the automatic means 6 determine which tooth of the mesh 41 corresponds to the tooth 2 obtained using the spectrophotometer 5. Lastly, the means 6 apply the shade and translucency values of the tooth 2 to the corresponding tooth 2 within the mesh 41. The tooth 2 and its colours within the mesh 41 can therefore be displayed in three dimensions.

Thus, as a result of the second phase 200, the user can view on a screen, within the tooth mesh 41, the tooth corresponding to the tooth 2 obtained using the spectrophotometer 5, with the shades and the translucency applied directly within the mesh 41 to the corresponding tooth.

We will now describe each of these steps.

II. Segmentation within the Triangular Mesh

II.a: Identification of Tooth Regions and their Central Triangles

The method corresponding to phase 100 is illustrated on FIG. 3 and with reference to FIGS. 4 to 20. The aim is to identify the teeth within the triangular mesh 41.

The digital model 4, comprising the triangular mesh 41 as illustrated on FIG. 4, has an origin O and three axes X, Y and Z. The triangles forming the surface of the digitised dental arch 41 each have a normal in the form of a vector. All the triangles have vertices whose coordinates on each of the axes, relative to the origin O, can be determined automatically.

The first step 11 is intended to eliminate the triangles oriented towards the inside of the mesh 41, so as to keep only the triangles reproducing the surface of the exposed dental arch, since it is there, on the surface of the teeth exposed towards the outside, that the shade and translucency values were obtained. Thus, all the triangles of the dental arch 41 are examined. For each triangle, the automatic means 6 determine a vector going from the centre of the triangle to the end of the normal to the triangle. Two distances are then calculated, with reference to FIG. 5: the distance 111 between the vector and the origin O of the model 4 and the distance 112 between the centre of the triangle, whose coordinates are calculated using the coordinates of the vertices of the triangles, and the origin O. If the first distance 111 is greater than the second distance 112, this means that the normal of the triangle is oriented towards the outside of the model. It is therefore "kept". Otherwise, it is deleted since considered as being oriented towards the inside. It will therefore no longer be examined in the next steps. Obviously, other ways of proceeding could be considered to eliminate the triangles oriented towards the inside of the model. Instead of the "deletion", we may speak of "marking". In all cases, the triangles are obviously still part of the digital model, but they must no longer be identified as "to be processed" in the next steps. We reach the illustration shown on FIG. 6 where the marked triangles 113 are those considered to be oriented towards the inside.

In the next steps, only the "kept" triangles representing the surface of the arch oriented towards the outside are considered. This step can therefore be used to delete a large number of the triangles which are not useful for the purposes of the invention and to perform the next steps only on the remaining triangles.

In step 12, whose sub-method is illustrated on FIG. 7, the aim is to classify the triangles into a concave category or a convex category. Those belonging to neither a concave region or a convex region are left "uncategorised". The objective of this step is to determine the boundaries of the teeth within the mesh 41. The teeth are in fact separated from each other by highly concave regions. Similarly, the regions separating a tooth from the gum are concave. Lastly, the boundary between the surface of the tooth oriented towards the outside of the model 4, and the inside of the model 4, in other words the region located at the apex of the teeth, is highly convex.

To determine these boundaries, the curvature between the triangles must be studied. The automatic means 6 thus examine each triangle of the mesh kept in the preceding step. For each of these triangles, the means determine the neighbouring triangles in sub-step 121, in other words the triangles which share an edge segment or a vertex in common with the triangle considered. Then, in sub-step 122, the means determine the triangles neighbours of the latter triangles, which can be called "second neighbours". FIG. 7 illustrates a triangle 71, a neighbouring triangle 72 and a second neighbour 73 which is therefore a triangle neighbour of the neighbouring triangle 72, itself neighbour of the triangle 71. Then, in sub-step 123, the means determine the angles between the triangle and each of the second neighbours. In other words, the means calculate the angles between, firstly the triangle, and secondly the triangles neighbours to the triangles neighbours to the triangle. To do this, the means use the normals of each triangle. By calculating the angle between the normal of a triangle and that of its second neighbour, we obtain the angle of curvature between the two triangles. Moreover, by calculating the scalar product between the normals, we can determine whether the angle is convex or concave. If the scalar product is negative, the means automatically add 180° to the angle and it cannot be considered to be concave.

If the angle between the triangle examined and one of its second neighbours lies within an interval from 30 to 150°, it is considered that the triangle examined is potentially located in a concave or convex region, since this region of triangles is clearly curved. The choice between concave and convex depends on the orientation of the normals of the triangles relative to each other and is therefore determined by the scalar product between the two normals. Thus, if the scalar product was negative and 180° had to be added to the angle, this angle will be considered to be "convex". Otherwise, if the angle was originally positive, it will be considered to be "concave". Thus, a counter, associated with the triangle examined, is incremented by one unit either to add the unit to the "convex angle" category or to the "concave angle" category as soon as an angle between the triangle examined and one of its second neighbours is located, possibly after adding 180°, in the predetermined interval. This amounts to calculating, for each triangle examined, the number of second neighbours highly inclined relative to the triangle examined, either in a convex or concave manner.

In sub-step 124, for the triangle examined, once all the angles with the second neighbours have been calculated, the means determine whether the triangle examined 71 must be left uncategorised, classified in "concave" category or classified in "convex" category. To do this, the means use the concave and convex angle counters. These counters are specific to a single triangle examined. If one of these counters has a value greater than the number of neighbours of the triangle divided by four, then the triangle is considered to be located in a respectively "concave" or "convex" region, and is therefore classified in this category by the means. Once all these steps have been completed, all the triangles of the mesh are therefore considered to be "concave", "convex", or "uncategorised". When they are neighbours, they form regions of several concave or convex triangles.

In step 125, the aim is to delete the noise in the concave regions of the mesh. Some triangles could in fact be classified in concave category although they are isolated, or they form only a small region. However, the objective is to determine large regions of several concave triangles which form the intersections between the teeth and the intersections between the teeth and the gum. These are necessarily large groups of triangles. The means therefore perform an additional check for each triangle examined which would have been classified in "concave" category. Consequently, they check, for each "concave" triangle, that each of its neighbouring triangles is also classified in concave category. When this is not the case, the triangles considered are classified as "uncategorised". This amounts to performing an erosion step by declassifying the triangles previously classified in concave category which would have a neighbouring triangle not classified in concave category. A second check is then performed on each triangle remaining in "concave" category. In this second check, only the triangles that have no "concave" neighbouring triangles are declassified. This amounts to declassifying the isolated triangles.

We then reach FIGS. 8 and 9. FIG. 8 illustrates the marked triangles 81 classified in concave category. FIG. 9 illustrates the marked triangles 82 classified in convex category. Note that they correspond to boundary regions of the teeth. The other triangles kept in the mesh but which are neither convex nor concave are "uncategorised".

Now that the triangles not important for the subsequent steps have been deleted and that the regions of concave triangles and triangles located in convex portions, which form the boundaries of the teeth, have been identified, the objective is to identify the tooth regions, in step 13, located within the limits of these boundaries. With reference to the sub-steps of step 13 illustrated on FIG. 10, the means 6 will first determine the seed triangles, then, from these seed triangles, identify regions of triangles neighbours to each other, forming tooth regions. We will now describe these steps in detail with reference to FIGS. 10 to 16.

First, in step 131, seed triangles are chosen on the surface of the triangular mesh. To do this, the automatic means 6 use a first plane A of fixed Y coordinate and a second plane B of fixed X coordinate. If the X axis defined by the intersection of these planes cuts a triangle of the mesh, as illustrated on FIG. 11, then this triangle is considered to be a seed triangle and is saved as such. The Y ordinate is then modified according to a predetermined step, and the new seed triangle (s) cut are saved. The same principle is applied for the X abscissa so that, eventually, seed triangles distributed over the entire dental arch are determined at regular intervals on the mesh. However, the automatic means only keep as seed triangle the triangles which are uncategorised, so that these seed triangles are not part of the boundary region between the teeth, but are necessarily located in teeth. We reach the image shown on FIG. 12, where the marked triangles 91 are the "seed" triangles determined. Each of these seed triangles is indexed as being part of a tooth region specific to it. Thus, at the end of this step 131, there are as many tooth regions as seed triangles, each tooth region consisting only of its seed triangle.

In step 132, the means consider each seed triangle 91. Each neighbour of a seed triangle is considered as being part of the same tooth region as the seed triangle if it is neither concave nor convex, and if the projection of its normal on the Z axis does not exceed a predetermined value of 0.75. Such values would mean that the triangle is located at the apex of a tooth, in the "biting region", which are planar regions but which do not correspond to the surface of the tooth. FIG. 13 illustrates various normals, including one referenced S which is located on the apex. For this normal, the corresponding triangle, although neighbour of a seed triangle and being neither convex nor concave, would not be selected as being part of the tooth region of the seed triangle.

Step 133 consists in considering, in each tooth region, the triangles selected, in turn, as seed triangles. Step 132 is then repeated for each of these new seed triangles, so as to extend each region to the neighbouring triangles that are neither concave nor convex, nor located in the biting region, nor assigned to another region. This step 133 ends when there are no more triangles to be added. Thus, each region has extended, as illustrated on FIG. 14, in such a way that each tooth has one or more series of tooth regions neighbours to each other. Each tooth region has its own index. Thus, all the triangles of a given region have the same index. By eliminating the concave and convex triangles as well as the biting regions, and since each triangle is only assigned to a single region, each tooth region only extends over a single tooth, not several.

Step 134 then consists in merging, within each tooth, the regions included in the tooth so that a tooth corresponds to a single region.

The means 6 therefore identify the boundaries between the regions two at a time, consisting of triangles in a given region neighbours of triangles of only one other region.

Once all the boundaries have been determined, if the number of triangles of the boundary exceeds a predetermined threshold, then the two regions are merged to form a single region. In this case, the threshold results from the following calculation: (number of triangles of the digital model/50 000)+1. It is therefore determined by the means 6 depending on the number of triangles of the model. This threshold was set empirically and could be different. Generally, it depends on the resolution of the mesh—therefore on the type of intraoral scanner which digitised the dental arch of the patient—and the means 6 can adapt it automatically depending on the scanner used. Merging of the two regions indicates that the means 6 assign the same index to the triangles of the two regions. Since this assignment is performed on all the boundaries at the same time, more than two regions can be merged simultaneously. Thus, if a region A includes a large number of triangles neighbours of a region B, which itself has a large number of triangles neighbours of a region C, then the regions A, B and C would be merged at the same time into a single region, in which all the triangles would have the same index.

With this step 134, we reach the image of FIG. 15, where each tooth has a single tooth region, in other words, for a given tooth, all the triangles of the tooth have the same index, which is different from that of the triangles forming another tooth.

However, at the end of step 134, in addition to the tooth regions actually corresponding to teeth, the mesh includes regions which correspond to other elements, such as the gums. However, to compare a tooth of this mesh with a two-dimensional tooth obtained using a spectrophotometer, it is important to delete the regions which, projected in two dimensions, would have the shape or even the dimensions of a tooth, but which within the mesh are clearly not teeth.

This is why the aim of step 135 is to delete these regions in particular. They can be distinguished from the tooth regions by the fact that the number of triangles in these regions is very high, or in contrast too low, or that these regions are especially flat. Apart from the gums, the dental arch can sometimes be digitised using a base. In this case, this step can be used to delete the region(s) corresponding to the base.

Thus, the means 6 determine the average curvature of each region. The means therefore determine, using the normals of the triangles, the curvature between each triangle and its neighbouring triangles, adding 180° to the angles having a negative scalar product. The means thus deduce the average curvature within the region. If this average curvature is greater than 170°, in other words close to 180°, then this region is too flat to correspond to a tooth and it is therefore deleted. Once again, "deletion" means "marking" so that these triangles are no longer considered and processed subsequently. This means that the triangles of the region no longer have an index, or in any case no more index corresponding to a tooth region. In other words, they can no longer be identified as being part of a tooth. The means 6 also determine the number of triangles of each region. If this number is less than a first threshold, or greater than a second threshold, then the regions are deleted in the same way, since they are too small or too large to correspond to teeth. In this case, the first threshold is set at 100 triangles. Below this value, which could be different, it is considered that the region cannot correspond to a tooth since it is too small. The second threshold corresponds to the result of the following calculation: (number of triangles of the model/number of regions of the model). This threshold, calculated by the means 6, therefore depends on the resolution of the model. It is deliberately high to avoid inadvertently deleting regions corresponding to teeth.

At the end of step 13, the triangular mesh is therefore segmented. We reach the image of FIG. 16. A tooth region corresponding to a tooth, and no other region, is shown. Thus, starting from the mesh 41 received, the method leading to step 13 has automatically resulted in the segmentation of the model to identify the triangles belonging to each tooth of the mesh 41. No information other than the mesh has been provided to the means 6. In particular, there was no need to identify one or more triangles manually. No action was therefore required by the user for the segmentation to take place automatically.

However, although this method results in segmentation of the teeth, the contours of the teeth, or some of them, may remain imprecise. By eliminating the triangles located in the convex and concave regions, and by eliminating the triangles oriented towards the inside and the triangles located in the biting region, triangles which in fact should be part of the tooth may have been eliminated. The boundaries of the teeth may therefore be slightly different from the shape and dimensions of the actual boundaries. However, to compare the two-dimensional tooth 2, obtained using the spectrophotometer 5, with the mesh 41 in order to find it, the contours of the teeth of the mesh 41 must be precise, to avoid identifying the wrong tooth in the mesh as corresponding to the tooth 2 or failing to identify the corresponding tooth.

II.b Identification of the Contours of Each Tooth

The method of phase 14, as illustrated on FIG. 17, therefore continues from step 14 and aims to determine the precise contours of the teeth.

To this end, step 141 aims to determine the centres of the tooth regions segmented in step 13. Thus, the means 6 determine, for each region, the coordinates of the centre of each triangle of the region, using the coordinates of the vertices of the triangle within the digital model. They then determine the coordinates of the centre of the region using the calculated coordinates of the centres of each triangle.

Knowing the coordinates of the centre of the region, the means 6 determine which triangle of the region is closest to this centre. To do this, they compare the distances between the centres of each triangle and the centre of the region, and assign the role of central triangle of the region to the triangle whose centre is closest. Once this has been done for each region, we reach the image of FIG. 18 where, for each tooth of the mesh, a central triangle, for example referenced C for one of the teeth, is identified.

In step 142, for each region, the means 6 operate as follows: they determine, for each triangle of the region, the average angle between this triangle and its neighbouring triangles, by calculating all the angle values between this triangle and its neighbours. If the average angle value is less than −0.05 radians, then the triangle is considered as being part of the tooth surface. This threshold has been determined so as to select triangles belonging to a flat tooth, such as a molar or an incisor, but also those belonging to a curved tooth, such as a canine. This threshold could be modified to make it depend on the resolution of the digital model.

Then, in step 143, the means 6 start a "Region-Growing" algorithm which, starting from the centre of each region, identified in step 141, aims to identify all the triangles forming a surface of the tooth, up to the ends of the tooth. They thus identify all the triangles neighbours of the central triangle and of the same region as also being part of the surface, even those which have not been identified as such in the preceding step 142. Then, for each of these triangles identified as being part of the surface, the means identify their neighbouring triangles that are in the same region as being part of the surface of the tooth. In this way, the surface of the tooth firstly comprises all the triangles of the tooth whose average curvature value is less than −2.864 degrees, but also all the triangles which are linked by a path of triangles neighbours to the central triangle, and which are part of the same tooth region. This continuous addition of neighbouring triangles is completed when there are no more triangles to be added since they are part of another region or of no region. At the end of this step 142, the tooth surface, including all the triangles identified as being part of it, corresponds approximately to the tooth. In particular, the surface does not normally include any holes, in other words any triangle not identified as being part of it but surrounded by triangles being part of it. Only its contours can be respecified, which is the purpose of the next steps.

Thus, in step 144, an expansion step is performed. The means must add, for any triangle of the surface, its neighbouring triangles, even if they had not been selected in step 142. Thus, the surface extends even further.

This expansion step may be repeated a certain number of times. If the number of triangles of the surface is less than the number of triangles of the tooth region and if at least twenty triangles could be added to the surface during the preceding expansion step, then a new expansion step is performed, and so on as long as the conditions are met for additional expansion. Obviously, the triangles added to the tooth surface must be part of the same tooth region.

In step 145, an erosion step is performed by the means 6. The aim is to delete the triangles whose neighbours would not all be part of the same surface. In other words, if a triangle has a neighbouring triangle that is not part of its surface, it is deselected or deidentified. It is no longer part of the surface.

At the end of step 145, all the teeth have a surface consisting of triangles and, for a given tooth, the boundaries of the surface correspond more to that of the tooth than the boundaries of the tooth region. We thus reach the image of FIG. 19. The contours of each of these surfaces can therefore be determined.

Optionally, an additional step 145 is aims to deselect some triangles of the surface whose orientation would be too different from that of the rest of the tooth. Thus, the means 6 determine the average normal of the surface using the normals of each triangle of the surface. Then, for each triangle of the surface, the angle between the average normal and the normal of the triangle is calculated. If its value is greater than 50° or less than −50°, the triangle is deselected: it is no longer part of the surface. This optional step aims to adjust the shape that the tooth will have once it is projected in two dimensions and compared with the 2D contour of the tooth 2 obtained using the spectrophotometer 5. It is optional since it aims to adapt the tooth of the mesh 4 to that obtained using the spectrophotometer 5. The image obtained using the Rayplicker, taken with a wide angle lens, may in fact be deformed compared with the image of a tooth obtained from the mesh. However, this deformation depends on the shade determination device—in this case the Rayplicker—which is why it is optional. Thus, it is not required for all comparisons, for example for reference teeth whose images would be obtained using another device which would not deform them. In addition, a similar step could be applied instead to the 2D contour of the reference tooth 2 so as to deform the contour of the tooth 2, if it is obtained using a spectrophotometer which slightly deforms the shape of the teeth, such as the spectrophotometer 5 of the "Rayplicker".

In step 146, the Bézier curve principle is applied to each tooth surface, so as to build a curve precisely identifying the contours of each surface.

For each tooth surface, therefore, the means 6 determine the triangles forming the contour of the surface, by selecting the triangles which have a neighbouring triangle not identified as being part of the surface. The means 6 determine the number of "checkpoints" as defined in the Bézier curve algorithm, depending on the number of triangles forming the contour of the surface. Alternatively, this number of checkpoints could depend on the number of triangles forming the entire surface. Lastly, by examining each triangle on this contour, a checkpoint is determined at regular triangle intervals. The Bézier curves can be determined using these checkpoints. They represent the contour of the tooth surface, as illustrated on FIG. 20.

At the end of step 14, the segmentation method is completed. Thus, starting from the mesh 41, the means 6 have automatically and precisely determined the contours of each tooth of the mesh, with no other information being provided by the user. Phase 100, including steps 11 to 14 and consisting in obtaining the contours of the teeth, is therefore completed. The contours of the teeth can now be used for various purposes. Subsequently, the method 200 will use these contours to find, within the mesh 41, which tooth corresponds to the two-dimensional tooth 2 obtained using the spectrophotometer 5. The aim is to be able to associate the shades and translucencies of this tooth 2 with the corresponding tooth of the mesh 41 within the model 4.

III. Correspondence Between 2D Tooth and 3D Mesh

We will now describe the method 200 illustrated on FIG. 21. The aim is to compare the representation of the tooth 2, obtained using the spectrophotometer 5, with the segmented mesh 41 in order to find the corresponding tooth therein.

In step 201 of the method 200, the means 6 obtain two-dimensional representations of the contours of each segmented tooth. The contours are those determined at the end of the method 100, but this method 200 also applies to tooth contours determined using another method. Thus, each tooth contour is projected onto a surface substantially parallel to the tooth. Thus, for any tooth 421 of the mesh illustrated on FIG. 22 in three dimensions, a corresponding image 422 is obtained representing the contour in two dimensions. The surface is filled with white pixels, the outside of the surface is filled with black pixels. The image 422 is therefore binary. The means thus determine the surface of each tooth of the mesh in two dimensions. The means also determine an image of the surface of the tooth 2, which is already represented in two dimensions. The subsequent steps consist in comparing this image of the surface of the tooth 2 with each of the images of the surfaces of the mesh in two dimensions. In the remainder of the document, we will refer to the tooth whose measurements were taken by spectrophotometry as being the "reference tooth". Among the teeth in the mesh, a search is conducted to find the "tooth corresponding" to the reference tooth.

The subsequent steps are performed for each surface—those of the teeth of the mesh as well as that of the reference tooth. Each pixel of a surface has an abscissa on a horizontal X axis and an ordinate on a vertical Y axis.

In step 202, we first try to determine an axis, using an affine function of the form $a*x+b$, separating the surface into two parts vertically to divide the surface into two equal parts. To do this, the means 6 first determine the central coordinate ymid of the surface, using the coordinate ymin of the lowest pixel of the surface and the coordinate ymax of the highest pixel of the surface. Then the means determine two points: the first point has the average X and Y coordinates of all the pixels of the surface located in the interval [ymin+(ymid−ymin)/4; ymid−(ymid−ymin)/4]. The second point has the average X and Y coordinates of all the pixels of the surface located in the interval [ymid+(ymax−ymid)/4; ymax−(ymax−ymid)/4]. Lastly, the means 6 determine the axis cutting these two points using the corresponding affine function of type $a*x+b$. The surface of the tooth is then divided into two parts, one on the left, the other on the right of the determined axis.

In step 203, the means 6 determine 19 substantially horizontal axes so as to divide the surface of the tooth into 20 adjacent parts from top to bottom, the axes being at equal distances from each other. To do this, the means reproduce calculations similar to those of step 202, but this time, instead of separating into two parts along a vertical axis, they aim to separate the surface into 20 parts along a horizontal axis. The 20 parts are cut as follows: from the axis determined during step 202, 19 points are determined. At each of these points, an affine function orthogonal to the function determined in step 202 is determined. We can say that the image has been "cut". We then reach the image of FIG. 23 where a surface is cut in two parts into 40 parts.

In step 204, the means 6 will determine 40 values, associated with precise points of the surface so that it can be compared with other surfaces.

Thus, for each of the 40 horizontal axes (20 horizontal axes each separated by the vertical axis), the means determine the length of the axis, in other words the distance, in number of pixels, between the point of the surface located on the horizontal axis and farthest away from the vertical axis, and also this horizontal axis. The distance is saved and associated with the horizontal axis.

In step 205, the means make comparisons between each tooth surface obtained from the mesh and the surface of the reference tooth. The distances calculated in step 204 are compared two by two for the corresponding axes. Thus, for each comparison between the surface of the reference tooth and the surface of a tooth of the mesh, the means determine the average difference between each distance calculated in step 204 for the surface of the reference tooth on the one hand and the corresponding distance of the surface of the tooth to be compared, on the other hand. The smaller the average difference, the more likely the tooth of the compared mesh will correspond to the reference tooth. This average distance is saved and will subsequently be used to determine the corresponding tooth.

In step 206, the means 6 determine, for each surface, a height/width ratio, in other words the ratio between the height of the tooth—the maximum distance along the Y axis between two points of the surface of the tooth—and the width of the tooth—the maximum distance along the X axis between two points of the surface. Each ratio of the teeth of the mesh is compared with the ratio of the surface of the reference tooth. If the difference between the ratio of the reference tooth and that of a tooth of the mesh is less than 0.4, then the tooth to be compared is selected for the next step. Otherwise, it is not selected.

In step 207, the surface of the reference tooth is transformed using the Levenberg-Marquardt algorithm. The aim is to modify its position in its two-dimensional representation, but also possibly to rotate it or modify its size so that it can then be superimposed on the surfaces of the teeth of the mesh and in order to calculate a relevant overlap coefficient.

An alternative to using the Levenberg-Marquardt algorithm is to rotate the contour of the reference tooth so that the two contours—that of the reference tooth and that of the tooth of the mesh—are oriented in the same way. A rotation angle value is therefore calculated from the vertical axis determined in step 203. A corresponding rotation is then performed on the contour of the reference tooth from this angle. This method seems to provide better results than the Levenberg-Marquardt algorithm while making this step 207 faster.

In step 208, the means 6 determine, for each surface selected in step 206, its overlap coefficient relative to the surface of the reference tooth transformed in step 207. This overlap coefficient is determined by placing the surface of the reference tooth under the surface of the tooth to be compared. We reach the image of FIG. 24. The number of pixels belonging to the two surfaces is thus determined and compared with the total number of pixels of the two surfaces. One way of calculating this overlap coefficient is to determine the number of pixels, of the overlap image 24, belonging neither to the contour of the surface nor to the contour of the reference tooth.

In step 209, the means calculate the final difference between the surface of the reference tooth and each surface selected in step 206. This calculation takes into account the average distance, in pixels, calculated in step 205 and the overlap coefficient of step 208. The formula is as follows: (2*average distance+overlap coefficient)/3. For the lowest value, the tooth used for the comparison is considered as corresponding to the reference tooth.

Thus, the means 6 automatically determined the tooth of the mesh 41 corresponding to the reference tooth 2 whose representation was obtained using the spectrophotometer 5.

In the final step 210, the means 6 apply the shade and translucency values calculated by the spectrophotometer 5 on the tooth 2, to the corresponding tooth within the mesh. This can be seen on the triangular mesh of the dental arch, where a texture corresponding to the reference tooth is applied to the corresponding tooth, so as to view the shade and translucency values in the 3D file directly, on the corresponding tooth. To do this, the texture, whose values are obtained using the spectrophotometer and which is in two dimensions, is stretched to cover the 3D surface of the triangular mesh. Thus, at the end of the method, the means 6 export a folder including the "stl" file of the mesh 4, a file including the shade and translucency values, and a file including all the segmentation and identification information determined using the method described, making the link between the mesh and the shade and translucency values. This folder will be used, via software such as "Rayplicker", in the name of the applicant, to display the dental arch with its associated shades. A prosthetist can extract the stl file including the mesh to machine the prosthesis. Obviously, the software used to display the arch with its shades will preferably be the same as that used to execute the method of the invention. Alternatively, other viewing software can be used to view the arch and its shades. We therefore obtain a tooth of the triangular mesh as illustrated on FIG. 25, where tooth portions correspond to particular shade and/or translucency values and are displayed within the mesh 41, in the digital model 4.

The invention is not limited to the embodiments described and other embodiments will be clearly apparent to those skilled in the art.

Thus, as an alternative to step 210 where the tooth of the mesh which best corresponds to the reference tooth is chosen, a functionality may be provided to manually select another tooth as corresponding tooth amongst the segmented teeth. The means may also sort the segmented teeth so as to provide a sorted list of teeth corresponding to the reference tooth, so that if the first tooth on the list is not the correct one, the next tooth is proposed to the user.

A situation where no corresponding tooth is determined in step 210 could also be planned. This may be the case if no tooth has been selected in step 206, or if the smallest final difference is not less than a predetermined value. Other ways of not identifying a tooth of the mesh as being a corresponding tooth can be considered.

The spectrophotometer 5, integrated in the applicant's Rayplicker, is a special measurement instrument used to obtain the shade and translucency values by transmission or reflection at different wavelengths. It can also be called a spectrocolorimeter. However, within the scope of the invention, any type of device or instrument that can be used to obtain the shade and/or translucency values of a tooth is acceptable. The invention is in fact independent of the way the surface of the reference tooth is obtained in two dimensions and with which the shade and/or translucency values are associated. The invention uses this surface to find the tooth of this surface within the mesh, and the way it is obtained is therefore unimportant.

Similarly, the type of intraoral scanner used to obtain the mesh 4 is unimportant.

Moreover, rather than a fully digitised arch, the segmentation method could concern a partial dental arch. In all cases, if the arch comprises a tooth, the method can be used to identify it.

It is also possible to vary all the threshold or interval values indicated provided that the chosen values can produce the required technical effect. In addition, the formulae and methods used to calculate the values or intervals indicated can be modified, once again, to produce the required technical effect.

Moreover, one of the methods described can be stopped at any step. In particular, the tooth regions determined in step 13 may be sufficient for some operations. Similarly, the tooth surfaces determined in step 144 or their contours determined in step 145 may subsequently be compared with teeth in a way different from that of the method 200. As a corollary, the method 200 can use segmented tooth contours in a way different from that of the method 100. For example, the user could draw or design him/herself the contours of the teeth on an interface. However, the method 100 is particularly adapted to provide tooth contours optimising the comparison of the method 200 and the sequencing of the two methods can be automatic, without any user action.

The invention claimed is:

1. A method for segmenting a digital model (4) of teeth comprising a three-dimensional triangular mesh (41), wherein a data processing device (6) is used to implement the following steps, which are referred to as initial steps:
   classifying (12), within the mesh (41), at least one triangle (81) into a concave category and/or at least one triangle (82) into a convex category, and
   identifying (13), within the mesh (41), at least one tooth region comprising triangles such that each triangle of the region has at least one neighboring triangle in the region, all the triangles of the region belonging to neither the convex nor the concave category.

2. The method according to claim 1, wherein, to perform the step of classifying (12) the triangle into the concave or convex category, the data processing device (6) implements the following sub-steps:
   for at least one of the triangles (71) of the mesh, determining (123) angle values between the triangle (71) and each neighboring triangle (73) of each triangle (72) neighbor to the triangle (71), and
   depending on the angle values determined, classifying (124) the triangle into a concave category or a convex category.

3. The method according to claim 2, wherein the data processing device (6) determines the angle values using the normal of the triangle and the normals of each neighboring triangle (73) of each triangle (72) neighbor to the triangle (71).

4. The method according to claim 2, wherein, for at least one triangle in the concave category, the data processing device (6) implements the following steps:
   determining (125) the number of triangles neighboring the triangle which are in the concave category, and
   if the number is less than a predetermined value, removing the triangle from the concave category.

5. The method according to claim 1, wherein, to perform the step of identifying (13) the tooth region, the data processing device (6) implements the following sub-steps:
   determining (131), within the mesh, a seed triangle (91) belonging to neither the concave category nor the convex category,
   selecting (132, 133) triangles neighboring the seed triangle (91), belonging to neither the concave category nor the convex category and whose respective normals have values that lie within a predetermined interval, and
   considering each of the triangles selected as a seed triangle, repeating the preceding step (132, 133) for each seed triangle, until there are no more uncategorised triangles to be selected, so as to identify the tooth region comprising the selected triangles.

6. The method according to claim 5, wherein the data processing device (6) determines, within the mesh (41), several separate seed triangles (91) not belonging to either the concave or convex category, so as to identify several separate tooth regions.

7. The method according to claim 1, wherein the data processing device (6) implements the following steps:
   for the tooth region or at least one of the tooth regions, determining a number of neighboring triangles located in a tooth region neighboring the tooth region,
   if the number of neighboring triangles is greater than a predetermined value, merging (134) the tooth region with the neighboring tooth region so that the two regions form a single tooth region.

8. The method according to claim 1, wherein the data processing device (6) implements the following steps:
   for the tooth region or at least one of the tooth regions, determining a number of triangles of the region and an average curvature value of the region,
   if the number of triangles is greater than a predetermined maximum value, less than a predetermined minimum value, and/or if the average curvature value is less than a predetermined threshold, marking (135) the tooth region so as to no longer identify the triangles of the tooth region as being part of a tooth region.

9. The method according to claim 1, wherein, prior to the initial steps, the data processing device (6) implements the following steps:
   for at least one of the triangles of the mesh (41), determining (11) an orientation of a normal of the triangle, and
   if the normal is oriented towards the inside of the mesh (41), marking (113) the triangle so as not to identify it as being part of a tooth region.

10. The method according to claim 1, wherein, after the initial steps, the data processing device (6) implements the following steps:
   for the tooth region or at least one of the tooth regions, determining (141) a base triangle (C) of the tooth region,
   from the base triangle (C), determining (14) contours of a tooth comprising the base triangle (C).

11. The method according to claim 10, wherein, since the base triangle (C) is a central triangle located at the centre of the tooth region, the data processing device (6) implements the following steps for its determination:
   determining the coordinates, within the mesh (41), of the centre of the tooth region, using the coordinates of the centre of each triangle of the tooth region, and
   determining the central triangle of the tooth region by comparing the coordinates of each triangle of the tooth region with the coordinates of the centre of the region that have been determined and by identifying as central triangle the triangle closest to the centre of the tooth region.

12. The method according to claim 10, wherein, to determine (14) the tooth contours, the data processing device (6) implements the following steps:
   for each tooth region, identifying each base triangle (C) of the tooth region as being part of a tooth surface corresponding to the tooth region,
   for each tooth region, determining (142) angle values between each triangle of the region and the neighbors of the triangle,
   determining (142) an average angle value for each triangle of the region according to the angle values determined,
   if the average angle value is less than a predetermined value, identifying the triangle as being part of the tooth surface corresponding to the tooth region,
   for each triangle neighboring the base triangle, if the neighboring triangle belongs to the tooth region of the base triangle, identifying (143) the neighboring triangle as being part of the tooth surface corresponding to the tooth region, considering each neighboring triangle selected as a base triangle, repeating (143) the preceding step for each base triangle, until there are no more triangles of the region to be identified as being part of the surface, for each tooth surface, expanding (144) the surface by adding to the surface triangles which are neighbors of the triangles of the surface and which belong to the same tooth region as the triangles of the surface, for each tooth surface, eroding (145) the surface by removing from the surface triangles which have a neighbor belonging to the same tooth region but not identified as being part of the surface, determining (146) the contours of the tooth surface by calculating one or more Bezier curves.

13. The method according to claim 12, wherein,
if the number of triangles of the surface is less than the number of triangles of the tooth region, or
if the number of triangles added after the expansion is less than a predetermined number,
new expansion (144) of the surface.

14. The method according to claim 10, wherein, to determine a correspondence between a reference tooth (2) of a two-dimensional representation and a tooth of the tooth digital model (4) comprising the three-dimensional triangular mesh (41), the data processing device (6) implements the following steps:

segmenting (100) the triangular mesh so as to identify contours of at least one tooth of the mesh, obtaining (201) a two-dimensional representation of a surface of the reference tooth, obtaining (201) a two-dimensional representation of a surface, delimited by the contours, of the tooth of the mesh, determining (206) a first ratio between a height and a width of the surface of the reference tooth and a second ratio between a height and a width of the surface of the tooth of the mesh, if the difference between the first ratio and the second ratio is greater than a predetermined value, identifying the tooth of the mesh as not corresponding to the reference tooth (2), otherwise:

transforming (207), according to the Levenberg-Marquardt algorithm, the two-dimensional representation of the reference tooth (2), so as to compare by overlap the surface of the reference tooth and that of the tooth of the mesh, determining (208) an overlap value between the surface of the reference tooth (2) and that of the tooth of the mesh, if the overlap value lies within a predetermined interval, identifying (210) the tooth of the mesh as corresponding to the reference tooth.

15. The method according to claim 14, wherein, instead of identifying the corresponding tooth directly using the overlap value, the data processing device (6) implements the following steps:

cutting (202, 203) the surface of the reference tooth so as to identify several parts of the surface, cutting (202, 203) the surface of the tooth of the mesh in a corresponding manner, determining (204) values in relation with each part of the surfaces determined, determining (205) a comparison value between the values determined for each part of the surface of the reference tooth and the respective values for each corresponding part of the surface of the tooth of the mesh, determining (209) an identification value between the surface of the reference tooth and the surface of the tooth of the mesh depending on the comparison value and the overlap value, if the identification value lies within a predetermined interval, identifying (210) the tooth of the mesh as corresponding to the reference tooth.

16. The method according to claim 14, wherein, after determining overlap values or identification values for several teeth of the mesh compared with the reference tooth, the data processing device (6) identifies as corresponding to the reference tooth the tooth of the mesh whose overlap value or identification value is the most appropriate.

17. The method according to claim 14, wherein, once the corresponding tooth of the mesh has been identified, the data processing device (6) identifies at some parts of the corresponding tooth of the mesh, within the mesh (41), one or more shade values associated with parts of the reference tooth (2), the parts of the reference tooth and the parts of the corresponding tooth of the mesh corresponding to each other.

18. A computer-readable recording medium, on which a computer program is stored, wherein the computer program comprises code instructions that, when executed by a processor, caused the processor to control execution of the method according to claim 1.

19. A method for segmenting a digital model (4) of teeth comprising a three-dimensional triangular mesh (41), wherein a data processing device (6) is used to implement the following steps, which are referred to as initial steps:

classifying (12), within the mesh (41), at least one triangle (81) into a concave category and at least one triangle (82) into a convex category, and identifying (13), within the mesh (41), at least one tooth region comprising triangles such that each triangle of the region has at least one neighboring triangle in the region, all the triangles of the region belonging to neither the convex nor the concave category.

* * * * *